July 15, 1969 — J. J. ROSEN — 3,456,046
METHOD FOR MAKING FOAMED ARTICLES WITHOUT UNDESIRABLE SEAMS
Filed Aug. 31, 1967 — 2 Sheets-Sheet 1

INVENTOR,
JACOB J. ROSEN
BY Jacobs & Dunckson
ATTORNEYS

July 15, 1969     J. J. ROSEN     3,456,046
METHOD FOR MAKING FOAMED ARTICLES WITHOUT UNDESIRABLE SEAMS
Filed Aug. 31, 1967     2 Sheets-Sheet 2

INVENTOR,
JACOB J. ROSEN

ATTORNEYS 3,456,046
METHOD FOR MAKING FOAMED ARTICLES
WITHOUT UNDESIRABLE SEAMS
Jacob J. Rosen, 5th Ave. at 61st St.,
New York, N.Y. 10021
Filed Aug. 31, 1967, Ser. No. 664,700
Int. Cl. B29h 7/20; B29c 1/14
U.S. Cl. 264—45                                    6 Claims

ABSTRACT OF THE DISCLOSURE

An effectively seamless shaped foamed article having extremities, which article is formed in a multi-part mold such that any flash occurs only along preselected normally hidden lines. To facilitate obtaining the effectively seamless end product, to permit stripping thereof from associated mold parts, to permit the use of an embedded bendable frame in the final product which aids stripping, prevents tearing and allows adjusting position of final product parts, and also to allow certain portions of the product to have special surface charracteristics, the mold cavity has one of three particular shapes.

BACKGROUND OF THE INVENTION

This invention relates to techniques used in producing foamed articles and is particularly concerned with the manufacture of foamed articles having selectively located seams or effectively seamless articles.

In my prior application Ser. Nos. 442,124 and 611,392 filed, respectively, on Dec. 30, 1964, and Jan. 24, 1967, and now both abandoned a process of making foamed articles, apparatus used therewith and articles produced thereby are discussed in considerable detail. Even though these prior applications relate to foamed articles generally, the exemplary embodiments discussed therein concern the production of baby doll bodies. Similarly, the present invention is directed generally to the production of foamed articles, but the invention can possibly be best understood with respect to baby doll bodies, and thus the same are used in presenting the illustrative emodiments hereof and in discussing the problems solved by the instant development.

In the aforesaid prior applications, the basic type of mold, basic technique utilized and basic final products are of major concern. More specifically, such applications contemplate the use of a multi-part mold, preferably a two-part mold, in which a foamable plastic material, preferably foamable PVC, is initially poured. The mold sections are then joined together and the mold is moved and heated so that the formable composition is first distributed throughout the entire mold so that at least a portion thereof forms a coating and thereafter the entire quantity of material is foamed. During the moving and heating, the interior cavity of the mold is vented, i.e., preferably in communication with the surrounding atmosphere, and as the material foams it fills the entire interior of the mold with the internal pressure being released so as to prevent malformation.

The instant invention is concerned with the same basic procedure, and like the prior applications, is also concerned with a final foamed article that has a smooth skin with desirable feel characteristics and a cellular and resilient construction without being hollow inside the outer skin. Consequently, in these respects, the present invention and the inventions of the above-mentioned prior applications share certain common features.

The present invention departs from the inventions of the prior applications in significant respects, the first of which is the fact that the present invention is particularly concerned with the provision of a final product which does not have seams in undesirable locations or which is effectively seamless, whereas the prior applications do not deal with this feature as such. To the contrary, such prior applications suggest only the use of a two-part mold, for example, where the junction between the mold parts is peripherally disposed longitudinally with respect to the final article. Taking a baby doll body as an example, the prior applications suggest specifically a two-part mold wherein one part of the mold is the part providing the cavity for the back half of the body and the other part of the mold is the part providing the cavity for the front half of the body. If a certain amount of flash is formed about the joint between the parts during the molding operation, then the final product has a seam which runs peripherally of the legs and arms and along the sides of the body.

Baby dolls in particular are intended in most instances to simulate the appearance of a human as closely as possible, and since humans do not have seams in their arms and legs, or in their bodies, it is most desirable to provide baby dolls which are free of such seams. Yet, when working with metal molds on a repetitive production basis, and when considering the costs of making perfectly matching molds, one soon realizes that in making a molded article such as contemplated by the prior applications and with the techniques thereof, flash cannot always be prevented. As a result one must face the practical problem which arises with respect to undesirable flash and the seams which result therefrom.

Considerable effort has been devoted to procedures for removing flash from molded articles, and while some of the procedures which have resulted from such efforts are satisfactory, nevertheless, it has previously been difficult if not impossible to preclude some type of seam, recess, or the like. Thus, while the basic techniques, basic apparatus, and basic products produced according to the prior applications mentioned above have all been successful, and while certain techniques may be successful in removing and/or minimizing flash, there remains a need for a mold, and a technique, which does not result in presenting any severe problem with respect to possible flash formation.

One of the very basic objects of the present invention is to satisfy this need by providing a mold and a technique which can be used to form a desired final foamed product such that, even if some flash should occur, the same is free of any significant objection.

Even further in this regard, it should be noted that in my prior application Ser. No. 630,950, filed Apr. 14, 1967, there is disclosed a technique and multi-part mold wherein the parting line or junction between mold parts is at least partially covered by what can be generically deemed an internal mold sealing band. The techniques and mold construction arrangement disclosed in this particular prior application can be especially useful with the present invention, and, in fact, an additional object hereof is to provide a mold arrangement in which the use of internal sealing bands, as disclosed in said prior application Ser. No. 630,950, is greatly facilitated, so as to permit the formation of essentially seamless foamed articles of the above-described type in multi-part molds.

Another problem of particular interest with respect to the present application concerns the ability to obtain desired definition of detail in the ultimate article. The prior applications contemplate the use of a foamable plastic composition, and in particular foamable PVC to make an ultimate article such as a baby doll. The article either includes means or devices for attaching hands and/or feet, or the article has hands and/or feet which are formed entirely from the foamed composition. Accordingly, one either has the convenience of simultaneously making the hands and/or feet with the body with the resultant loss of some fineness of detail, or one faces the inconvenience of making the hands and/or feet separately and then attaching the same to the basic foamed body.

With the present invention, the aforesaid choice can be eliminated, and in this connection, it is another very important object of the present invention to provide a mold and technique for forming foamed articles in generally the same manner as previously contemplated, but wherein particular parts can have the definition of detail or quality of appearance that is otherwise achieved at present only by using non-foamed vinyl plastisols.

In accordance with the present invention, the mold is so constructed that the junction between respective parts thereof lies in a position spaced from the arms and legs, as for example, where a doll is being made, such that these extremities are free of any seam whatsoever including any seam that may result from flash during the molding operation. Moreover, the hands and feet, in the example where a doll is being made, can have an external surface of a non-foamed composition, such as a quality vinyl plastisol, which external surface is provided by initially coating the corresponding mold location with the plastisol and thereafter using the foamable composition to form the remainder of the molded article as well as the interior of the parts carrying the special external surface. The resultant article, either with or without parts having special surfaces, is free of any possible seam in any undesirable location, such as along the arms or legs, and the seam, if any, which is encountered, is located in a normally unexposed portion of the article, such as, again for example, along the back or longitudinally or horizontally circumferentially about the body of a doll.

It is to be here understood that the preceding discussion and the description which follows refer specifically to baby doll bodies for convenience, and because such items are of primary concern to the assignee hereof. However, it is believed that the invention can be applied with equal utility and the same advantages to any molded article wherein the selective location of seams and/or the selective definition of detail of given surface areas are significant, such as animals, arm rests, and the like.

Consistant with the invention, the mold is so constructed that the final article is formed essentially in one of three positions, namely, (1) a position where the extremities extend forwardly of the main body portion, e.g., in the case of a doll body, in a position where the arms and legs extend forwardly of the main body portion; (2) a position where the extremities extend directly above and below the main body portion, e.g., in the case of a doll body, in a position where the arms are directly overhead and the legs directly downward; and (3) in a position where the extremities are positioned directly to the side of the main body portion, e.g., in the case of a doll body, in a position where the arms and legs are directly to the side of the main body portion.

The significance of these positions cannot be over emphasized, first because they permit the formation of an article of the desired characteristics by the techniques and with the equipment of said prior applications Ser. Nos. 442,124 and 611,392; second because they facilitate the use of the sealing band techniques and arrangements of said prior application Ser. No. 630,950; third because they permit the utilization of techniques to achieve special exterior surface areas in selective locations; and fourth, and of particular significance, because they permit stripping of the ultimately formed article from the mold without tearing.

The stripping aspect and the ultimate desired position of extremities are inter-related and very important individual factors. Again, using a doll body as an example, it should be apparent that the positions of the arms and legs mentioned above are not in most instances the desired ultimate positions. Specifically, if one wished to form an animal, the techniques and arrangements hereof might be used with the first position mentioned above since in the normal instance an animal has its extremities forwardly (i.e. downwardly). However, it is unusual to desire a doll, for example, where the normal position of the arms and legs are, respectively, straight-up and straight-down.

Accordingly, a further object of the invention is to achieve the desired result by using the aforesaid positions while still permitting proper or desired locating of extremities in the final article. Even further, it is an object hereof to form the final articles in one of such positions, and still, as indicated, overcome tearing problems which can be attendant to stripping by virtue of the close and intimate pressure contact between the article and adjacent mold surfaces during formation of the article.

To satisfy these latter objects, the invention contemplates in preferred embodiments, the use of an internal skeleton structure which preferably takes the form of a bendable wire frame arrangement. Thus, while certain final articles can be desirably produced in accordance herewith by using only the position aspects hereof, the more important features of the invention contemplate using the combination of both the position aspects and an internal wire frame so that the article can be properly stripped from the mold without tearing and all extremities can be moved to and retained in selected positions.

DESCRIPTION OF THE PREFERRED EMBODIMENT

The invention will be better comprehended and objects and advantages other than those set forth above will become apparent when consideration is given to the following detailed description. Such description refers to the annexed drawings presenting preferred embodiments of the invention and wherein.

Figure 1:
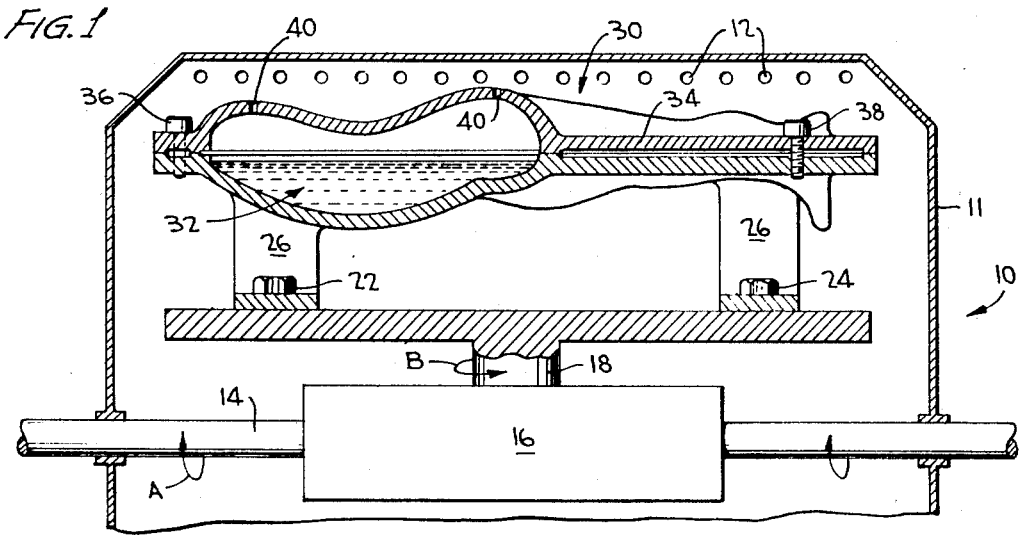
FIGURE 1 is a partially sectional, partially schematic side view of an exemplary form of the type of apparatus suitable for use in carrying out the present invention.

Referring first to FIGURE 1, it will be noted that a schematic presentation of a so-called rotational casting oven is shown therein. This oven 10 has a housing 11 and heating elements 12 which are designed to raise the temperature within the oven to the desired degree.

A shaft 14 extends through the oven and connects with a gear box 16. Leading from the gear box 16 is an output shaft 18 carrying a support plate 20 at its outer end. The shaft 14 is driven in the direction indicated by arrow A and the shaft 18 in turn is driven through the gear box 16 in the direction indicated by the arrow B. As a result, the support plate 20 rotates with the shaft 18 and orbits about the shaft 14. This is the conventional action within a rotational casting oven, and accordingly, further description of the details of construction or details of operation thereof is unnecessary. Suffice it to say that the invention contemplates the use of a conventional rotational casting oven.

Mounted on the support plate 20 by suitable bolts 22 and 24 are a pair of brackets 26 and 28, which brackets support a mold 30. In FIGURE 1, the mold is shown as having two parts, namely, a lower part 32 and an upper part 34 joined together by conventional bolts 36 and 38. The upper part 34 of the mold has vents 40 therein which communicate the interior of the mold with the surrounding atmosphere within the oven, or in any event, with an area of pressure less than that which is built up within the mold while carrying out the process hereof. The mold 30 is formed so that the part 32 provides the lower half of a doll body and the part 34 provides the upper part of a doll body. This is the type of arrangement discussed in the aforesaid prior applications Serial Nos. 422,124 and 611,392 and when the mold 30 is supported on the support plate 20 by the brackets 26 and 28, and the rotational casting oven is operated, the mold revolves or rotates and simultaneously orbits within the oven. A foamable vinyl material, desirably foamable PVC, is initially disposed or poured in the lower part 32 of the mold 30 before the upper part 34 is secured thereto by bolts or the like and thereafter the apparatus is activated so that the material is distributed and foamed to provide the final article.

All of the detailed description in the immediately preceding paragraphs and modifications thereof is more fully presented and explained in the previously mentioned prior applications Ser. Nos. 442,124 and 611,392, and accordingly, it is to be noted that FIGURE 1 is presented for purposes of setting forth the general technique and type of operation with which the present invention is directly concerned. To emphasize this aspect, compare the mold 30 of FIGURE 1 with the mold 50 of FIGURE 2. The mold 50 would be supported on the support plate 20 by suitable brackets such as the brackets 26 and 28 of FIGURE 1 and the mold filling operation and the rotational oven operation can be the same. However, the mold 50 does not have a junction between its parts extending longitudinally of the article formed therein, as is the case with the mold 30. To the contrary, the mold 50 includes a lower section 52 and an upper section 54. The lower section 52 defines the cavity for the major portion of the article to be formed therein. Here again, a baby doll body is used for exemplary purposes. The mold section 52 defines the arm cavities 56 and 56a and the leg cavities 58 and 58a as well as the major portion of the body cavity 60. The mold section 54 defines only that part of the body cavity 60 which will correspond to the buttocks, central back, and rear neck portion of the ultimate article. This can possibly be best understood by reference to FIGURE 3.

Figure 3:
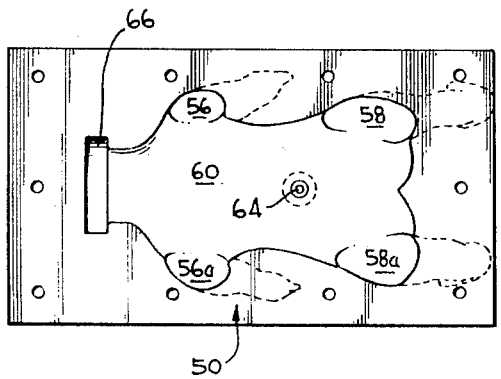
FIGURE 3 is a plan view of the lower half of the mold shown in FIGURE 2.

The plan view of the mold section 50 presented in FIGURE 3 shows clearly the arm cavity 56 as well as the corresponding other arm cavity 56a and the leg cavity 58 as well as the corresponding other leg cavity. 58a. It further shows the contour of the breast body portion 62 and the contour of the navel 64. It is clear from FIGURE 3, therefore, that the junction between the lower mold part or section 52 and the upper mold part or section 54 lies along the back and rear neck portions of the final article, namely, in a location which is normally hidden from view by virtue of the fact that the final product, namely, the baby doll, is dressed and has a head attached thereto. The head would be attached to the body by the projecting head-connecting portion formed in section 66 of the mold.

The mold 50, in addition to having the characteristics and structural aspects noted above, is further provided with vent apertures 68 and 69 which correspond to the vent apertures 40 in the mold shown in FIGURE 1. Significantly, however, the mold 50 is further associated with certain auxiliary components. Specifically, the mold section 52 has a recess 70 in the portion thereof which will ultimately underlie the navel of the final product or doll. This recess 70 communicates directly with a threaded aperture 72 that receives a closure plug 74 therein. The closure plug 74 is desirably a hex head bolt which can be easily removed from the aperture 72 by a mere turning or unthreading.

Resting within the recess 70 is the head 80 of a pry plunger 82 which further includes an upwardly extending bar or rod portion 84. The bar or rod portion 84 extends through a further opening 86 in the upper section 54 of the mold and in fact preferably projects therefrom.

The significances of the pry plunger 82 can be best appreciated with reference to the so-called stripping operation necessary to successfully remove a foamed article from the mold 50 after formation thereof within the mold. It will be remembered that consistent with the invention, the mold 50 initially has a foamable plastic material poured therein which results in a resilient, smooth surfaced, final product. During the operation where the product is formed, such composition is distributed throughout the mold 50 and thereafter foamed. To achieve the foaming, a blowing agent is used and as a result, substantial pressures are encountered within the mold cavity, which pressures bring the external surface of the final article into intimate contact and engagement with the interior mold surfaces. This pressure is only released by the vent apertures in the mold and, as explained in prior applications Ser. Nos. 442,124 and 611,392 noted above, there is a flow of material under pressure through the vent apertures when the article is fully foamed and ready to be removed from the oven. The net result is that the foamed article tends to resist any dislodging of its outer surface from the adjacent surface of the mold.

Figure 2:
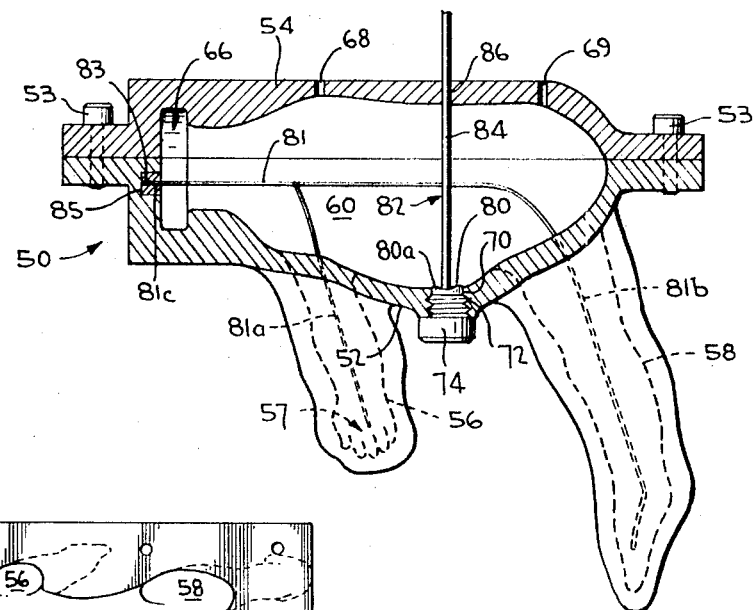
FIGURE 2 is a side view, partially in section, of one embodiment of a mold and related elements constructed in accordance with the present invention.

Accordingly, in the normal instance, if one attempted to merely open the mold 50 by removing the bolts 53 which join the sections 52 and 54 thereof together and then in some manner pinch or grab the exposed portion of the formed body, there would be tearing of certain surfaces in many instances. To overcome this problem, with the mold 50 of the invention, the mold parts are not separated initially. Instead, the bolts 53 maintain the mold sections 52 and 54 in joined relation as shown in FIGURE 2 when the mold is removed from the oven. At that time, the plug 74 can be removed and the rod 84 of the pry plunger 82 can be lifted to the desired extent. Lifting the rod 84 permits one to gently separate the portion of the final article surrounding the navel from the adjacent mold walls. Furthermore, air can be introduced through the aperture 72, which air will follow the peripheral contour of the final article and thus cause, under suitable pressure, a separation of the surface portions of the final article from the adjacent mold surfaces. The pressure of the air introduced through the aperture 72 is, according to the invention, adjusted, experimentally if necessary, to give the desired separation characteristics, or in other terms, to reduce or eliminate the severe tendency of the surface portions of the final article to "grip" the adjacent interior mold walls.

Once the rod 84 has been operated in the manner indicated and the air has been introduced into the mold, then one can immediately unscrew the bolts 53, remove the top mold part or section 54, and strip the final article from the mold.

There is thus provided a mold and a technique for forming a final product with an apparatus such as shown in FIGURE 1 and with a basic technique such as disclosed in the prior applications, which final product is free of any possible flash seams in any exposed area such as the arms or legs thereof, and which final product can be stripped from the mold with relative ease and without any severe danger of tearing the outer surface or any part thereof.

Although not discussed in detail above, there is one feature of the head 80 of the pry plunger 82 which is of some significance. As shown in FIGURE 3, the upper surface 80a of the head 80 has a contour corresponding to the general contour of a navel. The rod 84 obviously results in having a bore or longitudinal opening through the body of the ultimate product, but this feature is not unattractive because the navel is properly contoured and the aperture is relatively small. In other words, with the mold and technique hereof, seams are eliminated from undesirable portions of the final article and the aesthetic appearance of the article is maintained.

In FIGURE 2, the rod 84 of the pry plunger 82 is shown as extending through an aperture 86 in the mold section 54. While this is a preferred arrangement, it should be noted that the aperture 86 can be replaced by a recess opening interiorly to the mold cavity and the rod 84 can be shortened so as to fit within such recess but still be upwardly movable if pushed up by applying pressure to the head 80 upon removal of the plug 74. In this instance, as opposed to grasping the exposed end of the rod 84 during the initial prying operation, the plug 74 would be removed and a suitable implement or tool would be passed through the aperture 72 in the mold section 52 to exert an upward lift on the head 80 and in turn the portions of the formed body surrounding the head 80. This prying operation can be equally as effective as that which can be achieved with the preferred embodiment wherein the rod 84 has an exposed end that need merely be grasped and lifted.

It has been assumed previously in this discussion that the ultimate body is formed in its entirety of a foamable vinyl composition and preferably foamable PVC. However, the mold of FIGURE 2 permits a further desirable operation which could not be achieved successfully with molds of the type that were joined longitudinally of the ultimate product, i.e., molds such as the mold shown in FIGURE 1. Specifically, with the mold of FIGURE 2, if, for example, special definition of detail is desired for the hands of the final product, and/or if the hands are to be strengthened, then a special material can be initially applied to the portion of the mold which will form the hands. For example, the hand portion of the arm cavity 56, i.e., the portion designated by the number 57, can receive a high grade vinyl plastisol of the type conventionally used to make hollow dolls, and this material can be slush molded in the hand portion to an initial gel. Alternatively, a special material of conventional type could be painted, sprayed, or otherwise applied to any hand or foot portion of the mold. This is possible because with the mold of FIGURE 2, the hand part of the mold cavity has no seams and is essentially closed as distinct from being open or split, which would be the case with a mold of the type shown in FIGURE 1.

Once any desired hand or foot portion had the coating or gel therein by virtue of the above-described preliminary operation, the mold would then have a foamable PVC poured therein, and the mold would thereafter be closed by securing the sections 52 and 54 together and the operation would be the same as if the preliminary operation was not performed. Yet, due to the existence of the preliminary operation, the surface of the hands in the example being used would have quality and detail and the strength which can be achieved with regular and conventional plastisols used in making hollow doll bodies, but the final article would possess additionally all of the more desirable characteristics of the foamed article, namely an otherwise smooth skin, proper feel characteristics, and solidity with resiliency.

Assuming that one wished to have a final product which normally assumed the position in which it was molded, the above described procedure for FIGURES 2 and 3 can prove adequate. However, one usually desires to be able to selectively position the extremities of the final product. Moreover, for purposes of stripping the formed article from the mold, it is very desirable, and can be important, to essentially reinforce the article so as to prevent tearing and eliminate the need for exercising undue care in removing the formed article from the mold or, in this case, from the lower part 52 thereof. To this end, the preferred embodiment of the invention contemplates the use of a skeleton or wire frame such as the wire frame 81 with its associated arm and leg sections 81a and 81b, respectively. This wire frame is of conventional design and can correspond, for example, with the wire frame described particularly in connection with FIGURE 8. The wire frame 81 is initially placed and retained in the lower mold part 52 by inserting and thereby frictionally engaging the forward end 81c thereof in a recess 83 provided by an insert 85 in the mold wall. The wire frame 81 is bendable, yet sufficiently firm to maintain itself in a position to which it is bent. Accordingly, such frame is pre-bent to a suitable configuration so that it can be easily placed in the mold with all parts thereof except the forward end 81c being disposed in spaced relation to the mold walls. This results in having the final article formed with an internal skeleton or frame which is hidden within the article except for the projecting forward end 81c thereof. The degree to which this end 81c projects depends upon two factors, namely, the compressibility and resiliency of the ultimate product which will permit the removal of the forward end 81c from recess 83 and the length of projection desired to use as a head connection, if such forward end 81c is to be used for that purpose. Alternatively, the insert 85 can be elongated and connected, for example, by a dove-tail joint with the mold section 52 so that the same can slide upwardly upon removal of a formed article and completely separate from the mold during the stripping operation, thus being re-insertable when the mold is stripped and a new frame is to be placed in the mold. The important factor is to note that a bendable internal skeleton can be provided and easily accommodated within the mold.

Figure 7:
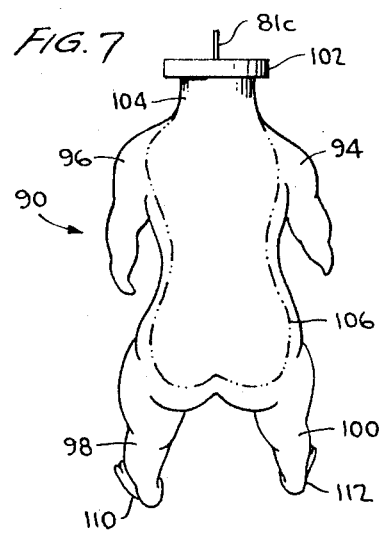
FIGURE 7 is a rear view of a doll constructed in accordance herewith and made with the embodiment of FIGURES 2 and 3.

Referring now to FIGURE 7, the doll body 90 shown therein has a back 92, arms 94 and 96, legs 98 and 100, and a head connecting portion 102 joined to the remainder of the body by a neck 104. The forward end 81c of the skeleton projects from the portion 102. This doll 90 is, for example, a doll which has been formed in a mold such as the mold 50, and according to the techniques discussed above. Since FIGURE 7 is a rear view, the arms 94 and 96 are shown as extending forwardly much in the same position that they would occupy when the article was initially formed in the mold. The legs 98 and 100, however, have been bent from the mold forming position downward toward their normal vertical position, being retained in position by the frame 81. Most significantly, it will be noted that a seam 106 extends along opposed sides of the back, above the transverse center of the body, across the butt or bottom of the main body portion, along the neck 104, and further, into and across the head connecting portion 102. This seam is the seam which results if any flash is formed during the mold operation, and even assuming that such flash is removed to some effective degree, the seam will remain. Yet, it is positioned on the body at the rear thereof and extends along portions that would be normally covered leaving the arms and legs completely free of any seam. The legs 98 and 100 terminate in feet 110 and 112, which feet are, according to a preferred embodiment of the invention, made with an outer coating of a vinyl plastisol and interiorly filled with the foamed polyvinyl chloride.

Even though the mold 50 of FIGURES 2 and 3 has been shown as a two-part mold, and even though in the modified embodiments discussed below, the molds are discussed in terms of having two parts, it is to be understood that the invention is not necessarily limited to a two-part mold, and instead, can comprise a multi-part mold formed of several parts joined together in suitable manner by bolts, screw threads, or other connecting arrangements. Regardless of the number of mold parts, however, the invention contemplates the selective location of junctions between mold parts such that any seams in the final article are for practical purposes along the part of the item normally hidden from view because of its clothing in the case of a doll, or because of its positioning in the case of other items. For example, where the insert 85 is elongated and joined to the mold part 52 with a dove-tail connection, any seam formed thereadjacent is hidden from view when the head is connected.

A single embodiment of the invention has been considered above in particular connection with FIGURES 2, 3 and 7, but there are other embodiments of the invention which are important and can be preferred. Consider first the mold 150 shown in FIGURE 4. This mold includes separate mold parts 152 and 154 joined together longitudinally of the body being formed therein by suitable bolts 156 cooperating with respective flange portions 158 and 160 of the mold parts 152 and 154. The mold parts of the mold 150, like the mold parts of the mold 50, define an interior cavity 153 corresponding to the shape of the final product which, in this instance, is again a doll body for illustrative purposes. However, the parts of the product are not in their normal position, and will be moved thereto by bending a skeleton frame 155.

Figure 4:
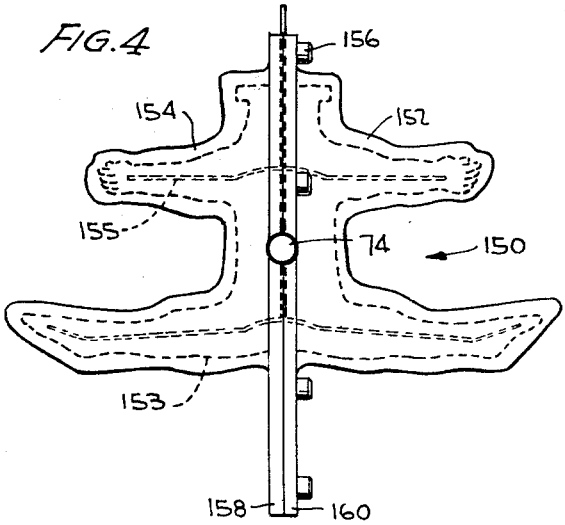
FIGURE 4 is an end view of a modified form of mold constructed in accordance herewith.
Figure 6:
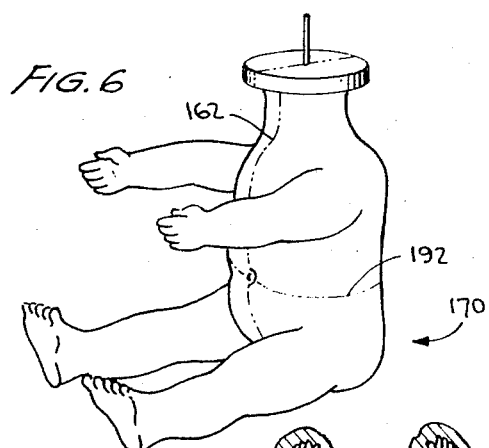
FIGURE 6 is an illustrative view of a doll constructed in accordance herewith, which doll has thereon alternate seams related to the embodiments of FIGURES 4 and 5.

It should be apparent that one difference between the mold of FIGURE 4 and the mold of FIGURE 2 resides in the configuration of the mold cavity used to form the final article. With the mold 50 of FIGURE 2, the final article is formed with the arms and legs extending downwardly—i.e., the final body assumes what may be regarded as a quadruped position. In contrast, the final article formed in the mold of FIGURE 4 has the arms extending to the side of the body, rather than forwardly thereof, and the legs extend to the side of the body, rather than downwardly thereof. Yet, the junction between the mold parts 152 and 154 lies in spaced relation to corresponding parts of the mold cavity used to form the arms and legs of the doll body. The junction extends vertically peripherally of the doll body so that if any flash is formed in the junction, the resultant article has a seam such as the seam 162 shown in dotted lines on the doll 170 of FIGURE 6. From FIGURE 6, it is apparent that such seam extends longitudinally of the body peripherally of the exterior thereof in a normally vertical direction, and in spaced relation to the respective extremities or arms and legs of the doll 170. As indicated, even though the arms and legs are formed to the side, the internal frame permits the selective positioning thereof after formation.

For the stripping operation with the arrangement of FIGURE 4, a plug such as the plug 74 of FIGURE 2 and a pry plunger such as the pry plunger 82 of FIGURE 2, can also be used. In FIGURE 4 only the head of the plug 74 is shown, and in this instance, such plug is disposed in cooperating flange portions of the mold itself. Yet, the same stripping technique as described above in connection with the mold 50 can be used with the wire frame 155 reinforcing and strengthening the article so as to preclude tearing during the stripping operation.

Figure 5:
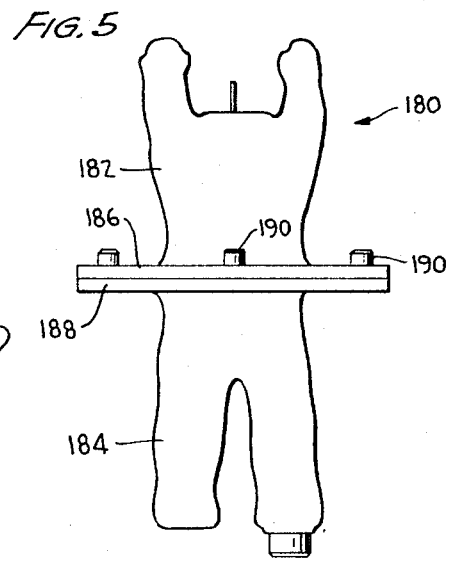
FIGURE 5 is a front view of another modified mold constructed in accordance herewith.
Figure 8:
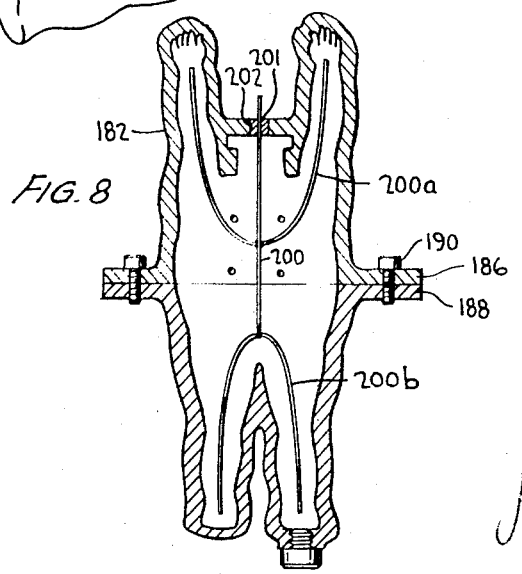
FIGURE 8 is a central longitudinal sectional view of the mold shown in FIGURE 5.

A still further and yet important and preferred embodiment of a mold constructed in accordance with the present invention is shown in FIGURE 5. Here, the final article, as with FIGURE 4, is formed in more or less of its upright position, rather than in quadruped position. Yet, the junction between the mold parts extends horizontally peripherally of the body being formed therein rather than vertically. The use of a transverse split mold as shown in FIGURES 5 and 8 is particularly important and preferred because the final article produced therewith is seamless from a practical standpoint by virtue of the fact that, at most, there is a single line seam extending around the stomach—i.e., the seam is not around the back or vertically over the entire main body portion as with the other embodiments, but instead is confined to the center of the body which is normally covered even with minimal clothing, such as underpants. Further, as explained below, the embodiment of FIGURES 5 and 8 readily permits the use of a mold seal band which can eliminate flash altogether.

In particular, the mold 180 of FIGURE 5 includes mold sections 182 and 184 which each include mold plate like supports 186 and 188. The mold plate like supports are joined together by suitable bolts 190 to close the mold. Again, the same basic technique is used for forming the article, but if flash results from the forming process, the same extends horizontally peripherally of the body resulting, for example, in the formation of a seam such as the seam 192 shown on the doll 170 presented in FIGURE 6. It has been assumed that the mold of FIGURE 5 is being used for forming a doll, and in this connection, reference should now be made to FIGURE 8 which presents a vertical sectional view of the mold shown in FIGURE 5. It is to be noted that disposed within this mold is a frame 200 which includes a vertically upstanding portion extending through the chest, neck and top connecting area of the doll, a U-shaped portion extending from the chest area up the respective arms of the doll, and a U-shaped portion extending from the crotch area down respective legs of the doll. This frame 200 has its top projecting through an opening 201 in an insert 202 in the upper mold section 182. As a result, when the final article is formed, the frame 200 is disposed interiorly thereof. When it is desired to strip the final article from the mold, the plug 206 is removed and air is admitted into the mold cavity to separate the surface of the final article from the adjacent mold parts. Thereafter, the bolts 190 are removed, and while an operator grasps the exposed end 202a of the frame 202, the lower section of the mold is separated from the lower part of the body. Thereafter, the article can be pulled from the upper section of the mold due to its resilient characteristics.

The frame 202 shown in FIGURE 8, as mentioned above, is generally the same as frames 81 and 155 incorporated in dolls formed in the mold of FIGURE 2 as well as dolls formed in the mold of FIGURE 4. In fact, with the mold of FIGURES 2 and 4, the frame preferably includes the U-shaped bottom portion, as well as the U-shaped cross-wire in the arm portions. This yields a final product wherein the wire is hidden, but the limbs can be adjusted to any selected position by the ultimate user. Moreover, the use of a wire, as explained in prior applications Ser. Nos. 442,124 and 611,392, facilitates the attachment of a head to the article, and further can be used for the attachment of separately formed hands.

Yet, if it is desired to make the final article in the molds of FIGURES 4 and 5 with special surface characteristics on the hands and/or feet, and/or other portions of the body, the interior of the mold can be initially coated in the desired area, in the same manner as explained in connection with the hands during the discussion of the embodiment of the mold shown in FIGURE 2. That is, a quality vinyl plastisol can be slush-molded, double slush-molded, painted, sprayed, or otherwise applied over the desired area, and depending on the material and, if necessary, gelled, prior to introduction into the mold of the foamable material which will result in the final article.

A further aspect of the invention concerns the specific construction of the mold itself. In each mold formed in accordance herewith vent apertures are utilized, such as the vent apertures 68 and 69 mentioned in connection with the mold of FIGURE 2 and the vent apertures 68' and 68'' and 69' and 69'' of the mold of FIGURES 5 and 8. Moreover, except for these apertures, the mold is not porous so that the venting is confined substantially exclusively to the vent apertures.

As explained in the above-mentioned prior applications Ser. Nos. 442,124 and 611,392, the number and position of the vent apertures can be varied, although it seems preferable to use apertures disposed in the area of the thickest part of the ultimate product. With respect to the stripping operation, the use of air is also discussed in such prior applications, and accordingly, further discussion herein is unnecessary. Even though particular sequences have been suggested above for removal of the final product from one mold section or the other, it is to be appreciated that the particular mold part first removed from the formed article is not necessarily critical. For example, in the arrangement of FIGURE 8, the frame 200 could have its lower members extended such that they project through the feet cavities of the mold, thus permitting the removal of the upper mold part while grasping the projecting lower part of the frame, instead of first removing the lower part of the mold while grasping the projecting part 202a of the frame 200.

With respect to the embodiments of FIGURES 5 and 8, it should be further noted that the cavities of the mold for forming the arms and legs are disposed directly vertically upwardly and directly vertically downwardly, respectively. Thus, during the stripping, there is no need for a relative translation or transverse movement, and instead the mold parts can be separated along a specific axis, which in this instance is, as shown, a vertical axis. Similarly, with the embodiment of FIGURE 4, the arms and legs of the final product at the end of the formation operation, are disposed directly laterally or perpendicularly to the mold seal thus permitting separation of the mold parts and stripping along a specific axis, which in the showing of FIGURE 4, would be a horizontal axis. The separation of the ultimate product from the mold is, therefore, in these instances, in a direction perpendicular to the direction of the joint between the mold parts. This not only facilitates the stripping, but additionally permits the easy insertion of the internal skeleton or frame in the desired position within the mold and further places such skeleton in the most desirable location for reinforcement during removal of the article from the mold, or the mold from the article.

In the embodiments of the invention discussed in detail in preceding paragraphs, it has been assumed that the final article will, at least in some instances, have some flash thereon, and even though this flash may be removed by one technique or another, there will remain a seam or a short flash projection. Still, the seam or short flash projection will be hidden from view in ultimate use of the article because of the manner in which the article is dressed—i.e., where a doll is involved, because the clothing thereon will cover the seam and the arms and the legs will have no seam, and in the case of the embodiment of FIGURES 5 and 8, the seam will only be of a minor nature, extending around only the center of the body portion. Yet the same considerations apply to articles other than dolls, such as, for example, animals. Even further, if any ultimate formed final shaped product made consistent herewith, any extremities projecting from the central or main portion of the body will be free of undesirable flash and also undesirable seams.

While the articles so described are accordingly "seamless" for practical purposes, there is one further aspect of the invention which should not be overlooked. Specifically, in my prior application Ser. No. 630,950, filed Apr. 14, 1967, there is disclosed a technique for effectively eliminating flash in the area, or at the junction between, mold parts. Consistent with this technique, and also consistent with the apparatus disclosed in that application, a sealing band is located about the junction between mold parts. This sealing band can take the form of a magnetic band, of an adhesively secured band, or the like. Moreover, it is normally secured to one of the mold parts so as to extend slightly inwardly of the cavity thereof, and then when the other mold part is attached, the band is flexed or moved so as to close the junction thereby precluding flash formation.

The disclosure of said prior application Ser. No. 630,950, filed Apr. 14, 1967, is not repeated herein since the invention thereof is specifically different than the invention of the present application. At the same time, this particular prior application is hereby incorporated herein by reference because with molds of the present invention, the techniques, apparatus, and components of that invention are particularly applicable.

Specifically, in this prior application directed to the mold sealing band techniques and apparatus, it is contemplated that the band could be located around the entire junction between mold parts wherein the mold is severable along lines that extend adjacent parts of the final article that may be quite irregular in contour, such as, for example, the hands. Yet, with the invention under consideration in the present application, such band sealing technique is particularly applicable because, for example, if the band sealing technique is used with a mold such as that disclosed in the embodiments of FIGURES 5 and 8 hereof, it is apparent that the band will extend about a junction which is in an area of relatively smooth or straight surfaces. Accordingly, the adaptation and intimate contact of the band to the adjacent surfaces can be achieved relatively easily and the resultant articles can, in such instance, have no flash seams whatsoever. Viewed from this standpoint also, therefore, the embodiment of FIGURES 5 and 8 is a preferred embodiment of the present invention, although the band sealing technique can be applied with facility to other embodiments of this application.

Having now described illustrative and preferred embodiments of the present invention in considerable detail, it should be apparent that the objects set forth at the outset of the present specification have been achieved.

Accordingly, what is claimed is:

1. In a method of making a foamed article from an unfoamed plastic composition, which composition is gellable and foamable, said method including preparing a multi-part mold which includes at least first and second mold parts each including internal article-forming surfaces and wherein, when said mold parts are assembled, an enclosed mold cavity is provided which defines a body portion and limbs with a parting line at the juncture of said first and second mold parts, the improvement comprising the steps of:
    (a) forming said mold parts such that said parting line is in spaced relationship with said limbs;
    (b) introducing an amount of said unfoamed plastic composition into said cavity, said amount being less by volume than the volume of said cavity, but sufficient upon foaming to substantially fill said cavity;
    (c) moving said mold and said cavity with said plastic composition therein to initially distribute said plastic composition throughout said cavity;
    (d) while moving said mold, gelling a layer of said plastic composition conforming to the shape of said article-forming surfaces;
    (e) foaming said gelled plastic composition therewithin;
    (f) while foaming said plastic composition, communicating said cavity through relatively small passageway means with an environment under less pressure than that existent within said cavity;
    (g) during at least said foaming maintaining said mold closed except for communication therewith through said passageway means; and
    (h) removing said foamed article from said mold cavity; whereby said foamed article is free of undesirably located seams.

2. The method of claim 1 wherein said foamed article is at least a portion of a baby doll.

3. The method of claim 2 further comprising the step of inserting a frame into said mold cavity prior to introducing said unfoamed plastic, said frame thereafter being essentially enclosed within said foamed article.

4. The method of claim 1 further comprising applying a high grade vinyl plastisol to selected portions of said article-forming surface and gelling said plastisol prior to introducing said unfoamed plastic, thereby obtaining an article with special detailed definition in areas corresponding to said selected portions.

5. The method of claim 1 further comprising providing a recess in said internal article-forming surface of one of said mold parts; providing a pry plunger disposed within said mold cavity, said pry plunger including a rod portion and a head at one end thereof, said head including an upper surface and a lower surface, said lower surface of said head resting in said recess; providing an aperture through said one mold part in communication with said recess; and moving said pry rod upwardly by applying pressure to said lower surface of said head through said aperture, thereby at least partially loosening said article from said article-forming surface of said one mold part prior to removing said article from said cavity.

6. The method of claim 5 wherein said article is further loosened from said article-forming surface of said one mold part by blowing air through said aperture prior to removing said article from said cavity.

References Cited

UNITED STATES PATENTS

| | | | |
|---|---|---|---|
| 2,017,216 | 10/1935 | Marcus | 18—42 |
| 2,152,311 | 3/1939 | Jacobson | 46—156 |
| 2,492,483 | 12/1949 | Keene | 18—42 |
| 2,569,869 | 10/1951 | Rempel | 264—310 XR |
| 2,629,134 | 2/1953 | Molitor | 264—310 |
| 2,710,427 | 6/1955 | Cantor | 264—310 |
| 2,839,788 | 6/1958 | Dembiak | 264—310 XR |
| 2,959,820 | 4/1960 | Miller et al. | 264—159 XR |

FOREIGN PATENTS 821,529   10/1959   Great Britain.

OTHER REFERENCES

Cram, D. J., "The Free Expansion of PVC Using Azodicarbonamide." In British Plastics, January 1961, pp. 24–29 (G).

PHILIP E. ANDERSON, Primary Examiner

U.S. Cl. X.R.

18—5, 46—156; 161—161; 249—55; 264—48, 310, 334, 42